May 27, 1969
R. G. JOHNSON ET AL
3,445,958
TOY VEHICLE WHEEL
Filed April 20, 1966
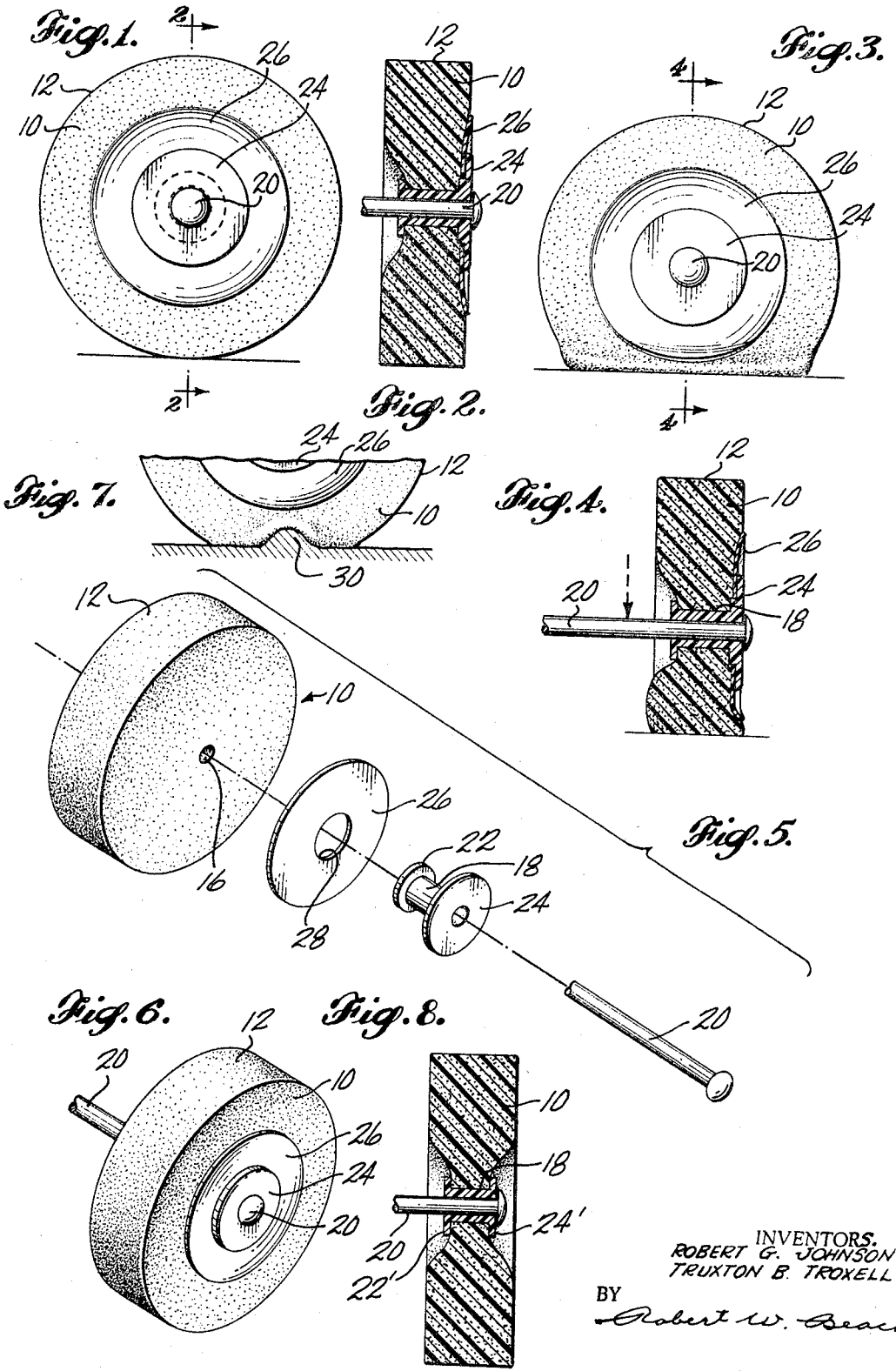
INVENTORS.
ROBERT G. JOHNSON
TRUXTON B. TROXELL
BY
Robert W. Beach
ATTORNEY United States Patent Office 3,445,958
Patented May 27, 1969

3,445,958
TOY VEHICLE WHEEL
Robert G. Johnson, 22109 110th Ave. W., Edmonds, Wash. 98020, and Truxton B. Troxell, 16014 Sunnyside Ave. N., Seattle, Wash. 98133
Filed Apr. 20, 1966, Ser. No. 543,972
Int. Cl. A63h *11/10*
U.S. Cl. 46—221          3 Claims

ABSTRACT OF THE DISCLOSURE

A resilient foamed plastic wheel has an unrestrained periphery constituting a rolling surface which is locally deformable about irregularities in surfaces over which it rolls. A sleeve to receive a vehicle axle is shorter than the axial extent of the wheel and extends through a central wheel aperture. Flanges on opposite ends of the sleeve compress axially the foamed material encircling the sleeve.

---

This invention relates to a wheel for toy vehicles which will enable such vehicles to be rolled substantially smoothly and noiselessly particularly over hard, rough surfaces.

A problem associated with toy vehicles, such as toy trucks, tractors, cars, trains and airplanes, for example, is that the vehicle will be upset or overturned when one of its wheels strikes a bump or protuberance while the vehicle is in motion. The wheels are usually constructed of a relatively rigid material, such as rigid plastic, wood or hard rubber, and any impact on such wheels will be transmitted to the body of the vehicle, thereby upsetting it.

Also, if a wheel rolls over a bump or projection, the body will be lifted locally so that the vehicle may be overturned or a load carried on the bed of a toy truck, for example, may be spilled. If a vehicle having rigid wheels is stepped on or hit by a falling object, it may be broken or crushed because it has no suspension springs. Consequently, it is a principal object of the present invention to provide an improved wheel for toy vehicles which is readily deformable to absorb shock and to permit the vehicle to roll smoothly over protuberances instead of bouncing or tilting.

Another object of this invention is to provide a wheel which will not mar furniture and other objects over which the vehicle is rolled or which a wheel strikes sharply.

Known deformable or shock-absorbing wheels have a rubber casing which must form an airtight enclosure and is filled with air. Such wheels are comparatively expensive to manufacture and are only moderately deformable upon impact. It is, therefore, a further object to provide a toy vehicle wheel which is simple to manufacture and assemble and which is made of inexpensive material.

An additional object is to provide a wheel which moves quietly over hard and rough surfaces and which by its shock-absorbing quality causes the vehicle to move with a minimum of jolting and noise.

The foregoing objects can be accomplished by using wheels formed of a cylinder of substantially homogeneous resilient material which will deform readily under slight pressure and which will return to its original cylindrical shape when such pressure is released.

FIGURE 1 is a side elevation of a wheel of the present invention and FIGURE 2 is a section taken on line 2—2 of FIGURE 1.

FIGURE 3 is a side elevation showing the wheel in depressed condition under a downward loading force, and FIGURE 4 is a section on line 4—4 of FIGURE 3.

FIGURE 5 is a top perspective showing the wheel components in exploded relationship, and FIGURE 6 is a top perspective of the assembled wheel.

FIGURE 7 is a fragmentary side elevation showing the wheel engaged with a protuberance.

FIGURE 8 is a vertical axial section of a modified form of wheel.

The wheel of the present invention includes a cylinder 10 of substantially homogeneous resilient material readily deformable by the application of slight pressure to it. The cylinder should be made of material sufficiently yieldable to deform locally where pressure is exerted. When such pressure is released, the cylinder should return promptly to its cylindrical shape. Resilient foam plastic or sponge materials, such as polyurethane foam, for example, have proven to be satisfactory.

The periphery 12 of cylinder 10 defines a rolling surface, and a small aperture 16 extends axially through the central portion of the cylinder. A sleeve 18 extends through the cylinder's aperture and is adapted to receive an axle 20 which may be attached rigidly to the body of a toy vehicle (not shown). The outer diameter of sleeve 18 is slightly greater than the diameter of wheel aperture 16 so that the resilient material of the wheel cylinder will snugly embrace the sleeve for conjoint rotation of the sleeve and cylinder.

Sleeve 18 is prevented from sliding axially in aperture 16 by flanges 22 and 24 upset on opposite ends of the sleeve and is shortetr than the axial width of the cylinder 10. These flanges are thus closer together than the axial width of the cylinder so that the material of the central portion of the cylinder is pinched between such flanges and compressed to densify the material of the wheel so as to improve the ability of such material to bear the concentrated load of the sleeve on the wheel material with minimum radial deformation of the central portion of the cylinder around aperture 16. In the form of wheel shown in FIGURES 1 through 7, a washer 26 is interposed between one face of the cylinder 10 and flange 24. This washer is of an outer diameter more than half the diameter of the wheel and is made of material having reasonable stiffness so as to distribute the axial pressure of flange 24 over a larger area and thereby depress the outer cylinder face to a lesser extent than the inner face is depressed by flange 22, as shown best in FIGURES 4 and 6. The diameter of this washer should not be so great as to interfere appreciably with substantially free deformation of the wheel periphery under stress, but the washer edge may be bendable under such stress by being made of soft plastic, rubber or even paper. In unstressed condition the washer is flat as shown in FIGURE 5. The diameter of washer aperture 28 is slightly larger than the diameter of flange 22 to permit such flange to be inserted through the diameter of it, but flange 24 is greater than the washer aperture diameter to hold the washer in place.

In the modified wheel shown in FIGURE 8, the washer 26 has been omitted and the two flanges 22' and 24' on sleeve 18' are shown as having substantially equal diameters. In this case the sleeve is shorter than sleeve 18 of FIGURE 2 so that the flanges are closer together. Consequently the material of the cylinder between such flanges is pinched harder to increase its density to a greater extent than in the assembly of FIGURE 2. Aperture 16 will therefore not expand as much by a given radial load exerted by the axle on the sleeve. It is contemplated that numerous other axle-receiving constructions may be employed with the wheel of the present invention.

FIGURES 3 and 4 show the wheel as it would appear under a relatively heavy load or upon landing on a solid surface when dropped from a height above the surface, for example. When the downward pressure on the axle is decreased to normal or removed, the wheel will resume its cylindrical shape. The wheel will thus absorb the shock of the impact of a vehicle dropped from a height, substantially reducing or eliminating damage to the vehicle. This same shock absorption provides the desirable protection for furniture, floors and other surfaces upon which the vehicle lands.

A further advantage of the shock-absorbing quality of the wheel is that, when the vehicle is coasting or being pushed or drawn across an uneven surface, the vehicle body frame will be maintained in a position substantially parallel to the surface because the wheel material is compressed locally to embrace obstructions and protuberances on the surface over which it is moved. As illustrated in FIGURE 7, when the wheel engages a protuberance 30 from an otherwise flat surface, the wheel deforms locally to embrace such protuberance instead of allowing the vehicle to bounce or tip. After passing over the protuberance, the wheel again assumes its normal shape, as shown in FIGURE 1. This feature of the wheel allows the vehicle body to move smoothly over a rough or uneven surface.

It is well known that conventional toy vehicle wheels of rigid material, such as plastic or wood, create noise when moved over hard surfaces, particularly when such surfaces are rough. Because of the lack of shock absorbency, such wheels cause the vehicle to bounce over rough surfaces and, unless the vehicle is of unitary construction, such vehicle will tend to rattle. By the same token, any load carried by the vehicle will also have a tendency to rattle. The wheel of the present invention, due to the features described above, itself moves silently over hard or rough surfaces and substantially reduces or eliminates the rattle of the vehicle and its load.

The cylinder 10 of the wheel can be made easily and economically. For example the cylinder with its sleeve-receiving aperture can simply be stamped out of foam plastic sheet stock. Another method of making the wheel cylinder to eliminate material waste would be to mold foam plastic in the form of a long cylinder in a tubular mold having an inside diameter equal to the desired wheel diameter. A rod extending through the tubular mold would form the sleeve-receiving aperture. After removing the plastic cylinder from its mold, individual wheels could simply be cut to the desired thickness by passing a heated wire transversely through the tube of foamed plastic.

The sleeve 18 and axle 20 are shown in the drawings to be made of rigid plastic, but these parts may be made of metal or other material.

To assemble the wheel, as indicated in FIGURES 5 and 6, the smaller flange 22 of sleeve 18 is inserted through aperture 28 of washer 26 until the inner face of the large flange 24 engages the washer face. Flange 22 is then inserted through aperture 16 of the wheel cylinder, which aperture can be deformed sufficiently to permit passage of such flange. An axle 20 of a toy vehicle is inserted through sleeve 18 so that the sleeve and disk will rotate about the axle in the conventional manner as the vehicle moves.

We claim as our invention:

1. A toy vehicle wheel comprising a body of substantially homogeneous resilient foamed plastic material having an unconfined periphery which is of substantially cylindrical shape when the material of the periphery is in relaxed condition, the periphery of said body defining a rolling surface and being deformable locally by application of pressure thereto and returnable automatically to its substantially cylindrical shape when such pressure is relieved, said body having a central axial aperture therethrough, and a sleeve adapted to receive an axle, said sleeve having a length shorter than the length of such aperture when the material of the central portion of said body is in relaxed condition, said sleeve extending through such aperture and including flanges on its opposite ends squeezing the central portion of said body located between said flanges and encircling such aperture to densify the material in the central portion of said body.

2. The wheel defined in claim 1, in which the body is polyurethane foam.

3. The wheel defined in claim 1, in which a washer is disposed on the sleeve between the body and one of the flanges, which washer is larger than such flange for distributing the axial pressure of such flange over the area of the resilient material body engaged by said washer.

References Cited

UNITED STATES PATENTS 3,022,810   2/1962   Lambe.
3,348,597   10/1967  Goldberg _____ 152—323

LOUIS G. MANCENE, *Primary Examiner.*

CHARLES R. WENTZEL, *Assistant Examiner.*